US009087177B2

(12) United States Patent  (10) Patent No.: US 9,087,177 B2
Omiya  (45) Date of Patent: Jul. 21, 2015

(54) METHOD, COMPUTER AND PROGRAM FOR MAKING OUT SEAT LAYOUT

(75) Inventor: Toshiyuki Omiya, Tokyo (JP)

(73) Assignee: P&W SOLUTIONS CO., LTD., Tokyo (JP)

( * ) Notice: Subject to any disclaimer, the term of this patent is extended or adjusted under 35 U.S.C. 154(b) by 786 days.

(21) Appl. No.: 12/306,189

(22) PCT Filed: Jun. 26, 2007

(86) PCT No.: PCT/JP2007/062762
§ 371 (c)(1),
(2), (4) Date: Dec. 22, 2008

(87) PCT Pub. No.: WO2008/001750
PCT Pub. Date: Jan. 3, 2008

(65) Prior Publication Data
US 2009/0187839 A1  Jul. 23, 2009

(30) Foreign Application Priority Data
Jun. 29, 2006 (JP) .................... 2006-179525

(51) Int. Cl.
G06F 3/0484  (2013.01)
G06F 17/50  (2006.01)

(52) U.S. Cl.
CPC ............ *G06F 17/509* (2013.01); *G06F 3/0484* (2013.01); *G06F 17/5004* (2013.01); *G06F 2217/74* (2013.01)

(58) Field of Classification Search
CPC .............................. G06F 3/0484; G06F 17/50
USPC ....................... 715/765, 839, 762; 434/72, 79
See application file for complete search history.

(56) References Cited

U.S. PATENT DOCUMENTS 5,444,836 A * 8/1995 Hollingsworth et al. ..... 345/634
5,463,722 A * 10/1995 Venolia ......................... 345/662

(Continued)

FOREIGN PATENT DOCUMENTS

JP 08-055141 2/1996
JP 08-106482 4/1996

(Continued)

OTHER PUBLICATIONS

Taking Advantage of Management Resources Developed in the Field of CRM ("I. M. Press", Japan, I. M. Press Incorporated, Nov. 25, 2005, vol. 115, pp. 18 to 19), together with English-language Abstract.

(Continued)

*Primary Examiner* — Kieu Vu
*Assistant Examiner* — Blaine Basom
(74) *Attorney, Agent, or Firm* — Scully, Scott, Murphy & Presser, P.C.

(57) ABSTRACT

The present invention has the objective of providing a method for reducing trouble in creating a seating layout by a method other than with templates. The computer 1 accepts a designating operation on position coordinates forming a base point in the prescribed display area from a user, accepts a designating operation of a direction of generating the seating symbol data from position coordinates as the base point in the prescribed display area, determines a position for displaying the seating symbol data in the prescribed display area, based on the base point and the direction, generates seating symbol data comprising position data representing the position determined, adds to the combination of the seating symbol data composing the seating layout data, and stores thereof in the memory 120, and displays the seating symbol data in the display unit 150 based on position data included in the generated seating symbol data.

12 Claims, 10 Drawing Sheets

(56) References Cited

U.S. PATENT DOCUMENTS

| | | | |
|---|---|---|---|
| 5,490,241 A * | 2/1996 | Mallgren et al. | 345/440 |
| 5,555,357 A * | 9/1996 | Fernandes et al. | 345/441 |
| 5,634,016 A * | 5/1997 | Steadham et al. | 715/753 |
| 5,798,752 A * | 8/1998 | Buxton et al. | 715/863 |
| 5,861,889 A * | 1/1999 | Wallace et al. | 345/619 |
| 6,480,813 B1 * | 11/2002 | Bloomquist et al. | 703/1 |
| 6,727,925 B1 * | 4/2004 | Bourdelais | 715/852 |
| 6,801,217 B2 * | 10/2004 | Andersson | 345/648 |
| 7,098,933 B1 * | 8/2006 | Thoemmes et al. | 345/677 |
| 7,689,936 B2 * | 3/2010 | Rosel | 715/852 |
| 7,999,827 B2 * | 8/2011 | Ford et al. | 345/619 |
| 2002/0161563 A1 * | 10/2002 | Elabiad et al. | 703/8 |
| 2004/0113945 A1 * | 6/2004 | Park et al. | 345/765 |
| 2005/0055180 A1 * | 3/2005 | Pischke et al. | 703/1 |
| 2005/0071138 A1 * | 3/2005 | Conchi et al. | 703/8 |

FOREIGN PATENT DOCUMENTS

| | | |
|---|---|---|
| JP | 10-207932 | 8/1998 |
| JP | 2003-288399 | 10/2003 |
| JP | 2005-128930 | 5/2005 |
| JP | 2005-323125 | 11/2005 |

OTHER PUBLICATIONS

Fighting Studio (editor), PlayStation Walk-through Series II, "Winning Strategy for a IV Evolution (Take the 'A' Train 4)" (Japan, Futabasha Publishers Ltd., May 30, 1998, Second Edition, pp. 6 to 7), together with English-language Abstract.

* cited by examiner

SEATING LAYOUT DATA

| SEATING SYMBOL ID | X-COORDINATE | Y-COORDINATE | NUMBER | ... |
|---|---|---|---|---|
| 0001 | 25 | 10 | 1 | ... |
| 0002 | 30 | 20 | 2 | ... |
| 0003 | 30 | 30 | 3 | ... |
| ⋮ | ⋮ | ⋮ | ⋮ | ⋮ |

FIG. 8

TEMPLATE DATA

| SEATING SYMBOL ID | X-COORDINATE | Y-COORDINATE |
|---|---|---|
| 0001 | 0 | 0 |
| 0002 | 5 | 10 |
| 0003 | 5 | 20 |
| ⋮ | ⋮ | ⋮ | ded to be

METHOD, COMPUTER AND PROGRAM FOR MAKING OUT SEAT LAYOUT

TECHNICAL FIELD

The present invention relates to a method, computer, and program for creating a seating layout.

BACKGROUND ART

In a call center that receives inquiry calls and the like from customers, or that makes sales calls and the like; or a contact center that introduces Internet technology, and carries out exchanges of e-mail, chat messages, and the like with customers (heretofore referred to as a "contact center"), placing of staff called operators or communicators (heretofore referred to as "communicators") is an important factor affecting work efficiency and quality.

Typically, an experienced manager, called a "supervisor" (SV), commands between a few to a few dozen communicators, and further, there are times when the supervisor (SV) may assist those communicators having less experience according to their experience or skills. Therefore, there is a need to create an optimal seating layout.

Conventionally, in a case when designing a seating layout for a contact center, a method in which basic components of a seating layout, called a template, are prepared beforehand, and those basic components are called out as needed for designing the overall layout, has been proposed (Patent Document 1).

According to the technology disclosed in Patent Document 1, based on layout patterns of seats (seating templates) stored in a seating placement pattern database, it is possible to create a seating layout. As a result, compared to a case in which a seating layout is created from scratch, it is possible to reduce trouble in creation, so it is possible easily to create a seating layout.

[Patent Document 1] Japanese Unexamined Patent Application Publication No. 2005-128930

DISCLOSURE OF THE INVENTION

Problems to be Solved by the Invention

However, even by the technology disclosed in Patent Document 1, as long as a seating layout is created based on a component called a template, in order to create a seating layout in which that component is not registered, there exists an issue that work to be done manually remains. In other words, compared to a case in which a seating layout is created by manual operation from the beginning, regarding portions matching those registered in a component called a template, although trouble in creation is reduced, regarding portions not matching those registered in the template, there is still a necessity to create the seating layout by manual operation.

Therefore, when creating a seating layout that cannot be dealt with by a template by manual operation, the provision of a method for further reducing trouble is desired.

Thus, the present invention has the objective of providing a method for reducing trouble in creating a seating layout by a method other than with templates.

Means for Solving the Problems

The present invention, for the purpose of the above-mentioned objective, more specifically provides the following:

According to a first aspect, in a method by which a computer (computer 1) creates a seating layout, in which:

the computer includes a memory (memory 120) for storing seating layout data composed to include a combination of a plurality of seating symbol data displayed at prescribed positions in a prescribed display area of a display unit (display unit 150), the method comprises steps of:

accepting a designating operation on position coordinates forming a base point in the prescribed display area from a user of the computer for the purpose of generating the seating symbol data;

accepting a designating operation of a direction of generating the seating symbol data from position coordinates as the base point in the prescribed display area from the user;

determining a position for displaying the seating symbol data in the prescribed display area, based on position coordinates as the base point and the direction of generating the seating symbol data;

generating seating symbol data comprising position data representing the position determined, adding to the combination of the seating symbol data composing the seating layout data, and storing thereof in the memory; and displaying the seating symbol data in the prescribed display area in the display unit (display unit 150) based on position data included in the generated seating symbol data.

According to this configuration, an operational effect is achieved in which the computer includes a memory (memory 120) for storing seating layout data composed to include a combination of a plurality of seating symbol data displayed at prescribed positions in a prescribed display area of a display unit (display unit 150), accepts a designating operation on position coordinates forming a base point in the prescribed display area from a user of the computer for the purpose of generating the seating symbol data, accepts a designating operation of a direction of generating the seating symbol data from position coordinates as the base point in the prescribed display area from the user, determines a position for displaying the seating symbol data in the prescribed display area, based on position coordinates as the base point and the direction of generating the seating symbol data, generates seating symbol data comprising position data representing the position determined, adds to the combination of the seating symbol data composing the seating layout data, and stores thereof in the memory, and display the seating symbol data in the prescribed display area in the display unit (display unit 150) based on position data included in the generated seating symbol data.

As a result, it is possible for the computer, by accepting the designating operation of the base point and the direction from a user of the computer, automatically to generate new seating symbol data, and to display it on the display unit in creating a seating layout.

Here, the designating operation of the base point can be accepted by clicking a desired position with a pointing device such as a mouse or the like on a seating layout displayed on the display unit. Alternatively, the display unit can be configured as a display device including a touch panel function, and the designating operation can be accepted by way of the touch panel applied. Otherwise, various designating operations matching the principles of the present invention can be accepted.

Furthermore, the designating operation of the direction can be accepted by pressing a directional button displayed on the display unit by a pointing device of a mouse or the like, or can be accepted by assigning directions of up, down, left, right, upper-right, upper-left, lower-right, lower-left, and the like, respectively, to arrow keys or numeric keys of a keyboard and pressing each key. Alternatively, other suitable devices for accepting a designating operation of a direction can be items such as a joystick, 8-directional button or the like. Otherwise, if the designating operation matches the principles of the present invention, it is possible to be realized by various designating operations.

As a result, it is possible for the user to reduce trouble in creating a seating layout by manual operation with a method other than using a template created beforehand.

In a second aspect, the method described in the first aspect comprises steps of: storing in the memory the display position of the seating symbol data generated as position coordinates to be the next base point;

further accepting a designating operation from the user of a direction generating the seating symbol data;

determining a position for displaying the seating symbol data in the prescribed display area, based on position coordinates as the base point and the direction of generating the seating symbol data;

generating seating symbol data comprising position data representing the position determined, adding to the combination of the seating symbol data composing the seating layout data, and storing thereof in the memory; and based on position data included in the generated seating symbol data, displaying the seating symbol data in the display unit in the prescribed display area.

According to this configuration, an operational effect is achieved in which the computer stores in the memory the display position of the seating symbol data generated as position coordinates to be the next base point, further accepts a designating operations from the user of a direction generating the seating symbol data, determines a position for displaying the seating symbol data in the prescribed display area, based on position coordinates as the base point and the direction of generating the seating symbol data, generates seating symbol data comprising position data representing the position determined, adds to the combination of the seating symbol data composing the seating layout data, and stores thereof in the memory, and based on position data included in the generated seating symbol data, displays the seating symbol data in the display unit in the prescribed display area.

As a result, it is possible for the computer, after once accepting a designating operation of the base point from the user, to generate continuously afterwards the seating symbol data each time a designating operation of the direction is successively accepted.

Here, configuring the method such that, by accepting a pressing of an icon button by a pointing device such as a mouse or the like or a pressing of a prescribed key such as a function key or the like, the computer transitions an input mode to a "consecutive generation mode" of seating symbol data, and, until accepting a cancellation operation from a user, even after accepting operations of a scroll bar, a zoom button, or the like, displayed in the display unit, by accepting designating operations of the direction, the computer can carry out generation of seating symbol data continuously.

As a result, it is possible for the user, after first carrying out a designating operation of a base point, further to reduce trouble in creating a seating layout including a series of seating symbol data. For example, it is possible for the user to create seating layouts including such series of seating symbols that can be created without lifting the writing instrument as a row, a column, an island, a block, or the like, with less trouble.

In a third aspect, the method described in the first aspect or the second aspect comprises steps of: accepting a selection operation of one or a plurality of the seating symbol data from the user for the purpose of numbering numbers to seating symbol data included in the combinations, accepting an instructional operation of numbering numbers from the user, determining the numbers and storing thereof in the memory based on prescribed numbering rules relating to respective position coordinates in the prescribed display area in relation to seating symbol data having received the selection operation, and displaying the determined numbers in the display unit.

According to this configuration, an operational effect is achieved in which the computer accepts a selection operation of one or a plurality of the seating symbol data from the user for the purpose of numbering numbers to seating symbol data included in the combinations, accepts an instructional operation of numbering numbers from the user, determines the numbers and stores thereof in the memory based on prescribed numbering rules relating to respective position coordinates in the prescribed display area in relation to seating symbol data having received the selection operation, and displays the determined numbers in the display unit.

As a result, it is possible for the computer, regarding the one or a plurality of seating symbol data selected by a selection operation, automatically to number the data according to prescribed numbering rules.

Here, the designating operations of the one or a plurality of seating symbol data can be accepted by dragging a desired area with a pointing device such as a mouse or the like on a seating layout displayed on the display unit. Alternatively, the display unit can be configured as a display device including a touch panel function, and the designating operation can be accepted by way of the touch panel applied. Otherwise, if the designating operation matches the principles of the present invention, it is possible to be realized by various designating operations.

As a result, it is possible for the user, after generation of a series of seating symbol data, based on the abovementioned prescribed numbering rules for the selected one or a plurality of the seating symbol data, to carry out numbering collectively, so it is possible to reduce trouble in numbering.

In a fourth aspect, the method described in the third aspect further comprises a step of, regarding the prescribed numbering rules, accepting from the user a designating operation of assigning priority to x-coordinates and y-coordinates constituting the position coordinates and designating operations of ascending or descending order to the position coordinates.

According to this configuration, an operational effect is achieved in which the computer, regarding the prescribed numbering rules, accepts from the user a designating operation of assigning priority to x-coordinates and y-coordinates constituting the position coordinates and designating operations of ascending or descending order to the position coordinates.

As a result, it is possible for the computer, by accepting designating operations of such rules as "Ascending Order for x-coordinates" or "Descending Order for y-coordinates" composing the position coordinates, and the like, to apply the rules as the prescribed numbering rules.

More specifically, it is acceptable for the prescribed numbering rules, by a pointing device such as a mouse or the like or an input device such as a keyboard or the like, to accept and confirm input for preference menus or dialog boxes of numbering rules displayed on the display unit. For example, it is acceptable for such designations as "from the right (i.e. descending order for x-coordinates)", "from the left (i.e. ascending order for x-coordinates)", "from above (i.e. descending order for y-coordinates)", "from below (i.e. ascending order for y-coordinates)", and the like to be accepted by radio buttons and the like, and for consecutive numbering to be carried out in sequence, or for the starting number for the numbers to be numbered to be accepted via a text box. Otherwise, as long as the designating operation matches the principles of the present invention, it is possible to determine the rules by various designating operations.

As a result, it is possible for the user freely to set the above-mentioned prescribed numbering rules.

In a fifth aspect, the method described in the first aspect or the second aspect further comprises steps of: accepting a designating operation of starting numbering numbers of the seating symbol data from the user in a selected order;

accepting a selection operation of the seating symbol data; and incrementally numbering in sequence the seating symbol data for which the selection operation has been accepted.

According to this configuration, an operational effect is achieved in which the computer accepts a designating operation of starting numbering numbers of the seating symbol data from the user in a selected order, accepts a selection operation of the seating symbol data, and incrementally numbers in sequence the seating symbol data for which the selection operation has been accepted.

As a result, it is possible for the computer to carry out incrementally numbering one by one the seating symbol data for which a selection operation is accepted in sequence each time.

Here, configuring the method such that, by accepting a pressing of an icon button by a pointing device such as a mouse and the like or a pressing of a prescribed key such as a function key and the like, the computer transitions an input mode to a "consecutive numbering mode" of numbers corresponding to seating symbol data, and until accepting a cancellation operation from a user, even after accepting operations of a scroll bar a zoom button, or the like, displayed in the display unit, by accepting designating operations of the seating symbols, the computer can carry out incremental numbering one by one of the seating symbol data consecutively.

As a result, it is possible for the user to carry out incremental numbering one by one for seating symbols in sequence, just by repeating intuitive and easy-to-understand operations of selection operations of seating symbol data by a pointing device or the like such as a mouse and the like.

In a sixth aspect, the method described in any of the first to fifth aspects comprises steps of: accepting a selection operation of a plurality of the seating symbol data from the user;

accepting a designating operation of storing a template; and storing in the memory, as new template data, relative position coordinates of each of the plurality of seating symbol data for which the selection operation was accepted.

According to this configuration, an operational effect is achieved in which the computer accepts a selection operation of a plurality of the seating symbol data from the user, accepts a designating operation of storing a template, and stores in the memory, as new template data, relative position coordinates of each of the plurality of seating symbol data for which the selection operations were accepted.

As a result, it is possible for the computer, by storing a plurality of seating symbol data, which were generated by once accepting a manual operation, as new template data, further to reduce trouble in creating seating layout data afterwards.

As a result, it is possible for the user to store components of seating layout data created by manual operation as a template, and further to reduce trouble in creating seating layout data afterwards.

According to a seventh aspect, a computer for creating a seating layout comprises:

a memory for storing seating layout data composed to include a combination of a plurality of seating symbol data displayed at prescribed positions in a prescribed display area of a display unit, a unit for accepting a designating operation on position coordinates forming a base point in the prescribed display area from a user of the computer for the purpose of generating the seating symbol data a unit for accepting a designating operation of a direction of generating the seating symbol data from position coordinates as the base point in the prescribed display area from the user, a unit for determining a position for displaying the seating symbol data in the prescribed display area, based on position coordinates as the base point and the direction of generating the seating symbol data, a unit for generating seating symbol data comprising position data representing the position determined, adding to the combination of the seating symbol data composing the seating layout data, and storing thereof in the memory, and a unit for displaying the seating symbol data in the prescribed display area in the display unit based on position data included in the generated seating symbol data.

By deploying this computer, it is possible to anticipate the same effect as the first aspect.

According to an eighth aspect, a program for creating a seating layout in a computer, the computer comprising a memory for storing seating layout data composed to include a combination of a plurality of seating symbol data displayed at prescribed positions in a prescribed display area of a display unit, wherein the program executes steps of:

accepting a designating operation of position coordinates forming a base point in the prescribed display area from a user of the computer for the purpose of generating the seating symbol data;

accepting a designating operation of a direction of generating the seating symbol data from position coordinates as the base point in the prescribed display area from the user;

determining a position for displaying the seating symbol data in the prescribed display area, based on position coordinates as the base point and the direction of generating the seating symbol data;

generating seating symbol data comprising position data representing the position determined, adding to the combination of the seating symbol data composing the seating layout data, and storing thereof in the memory; and displaying the seating symbol data in the prescribed display area in the display unit based on position data included in the generated seating symbol data.

By installing this program into the computer and deploying the computer, it is possible to anticipate the same effect as with the first aspect.

Effects of the Invention

According to the present invention, by accepting designating operations of a base point and a direction from a user of a computer, it is possible automatically to generate new seating symbol data, and to display thereof on the display unit. As a result, it is possible for the user to reduce trouble in creating a seating layout by manual operation with a method other than using a pre-created template.

BRIEF DESCRIPTION OF THE DRAWINGS

FIG. 8 is a diagram illustrating template data;

PREFERRED MODE FOR CARRYING OUT THE INVENTION

Below, an embodiment of the present invention is explained below with reference to the drawings. Moreover, this is only an example, and the technical scope of the present invention is not to be limited thereto.

Figure 1:
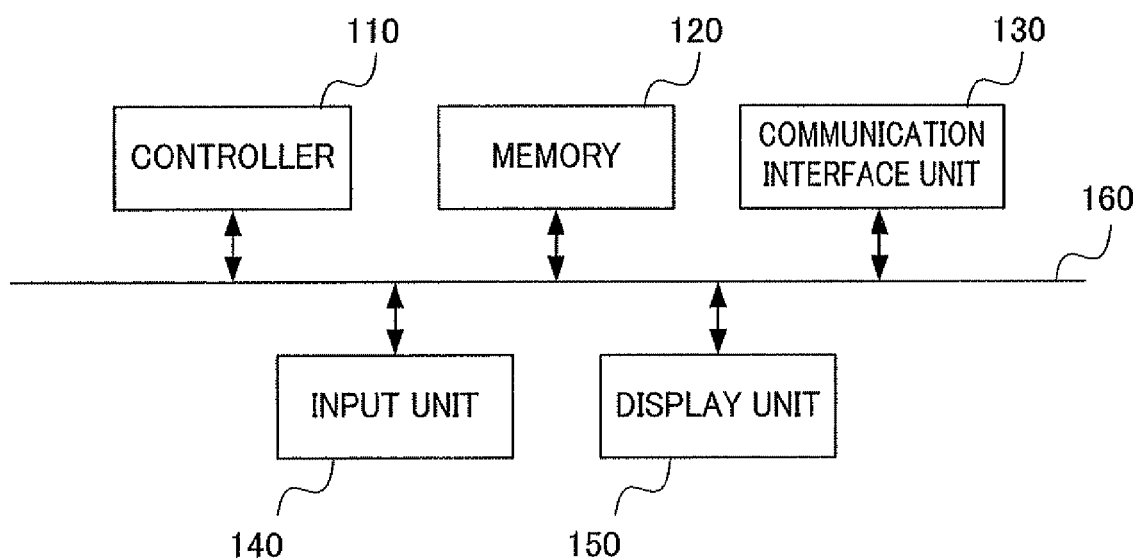
FIG. 1 is a block diagram illustrating a functional configuration of a computer 1 relating to a preferred embodiment of the present invention.
Figure 2:
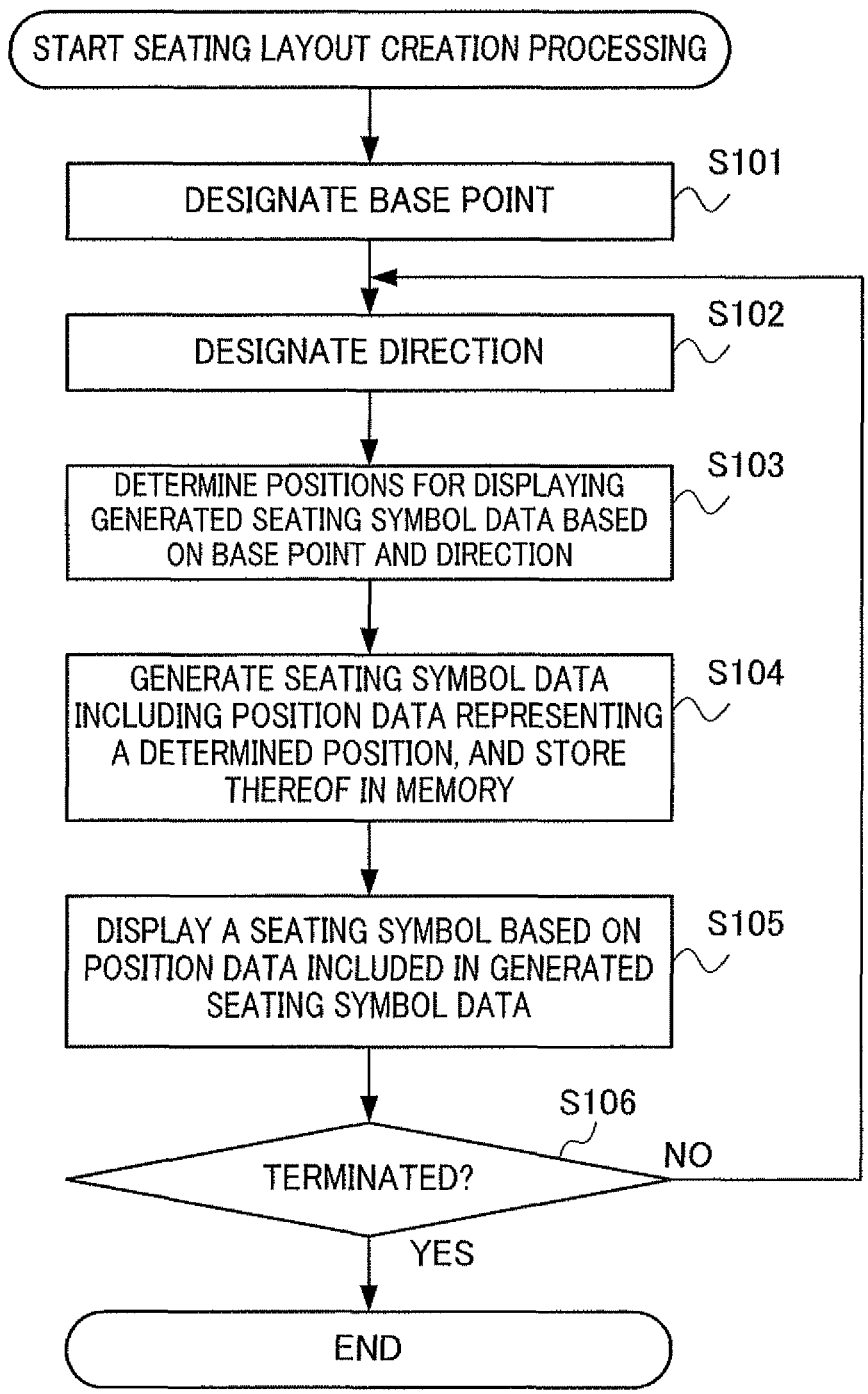
FIG. 2 is a flowchart illustrating seating layout creation processing.
Figure 3:
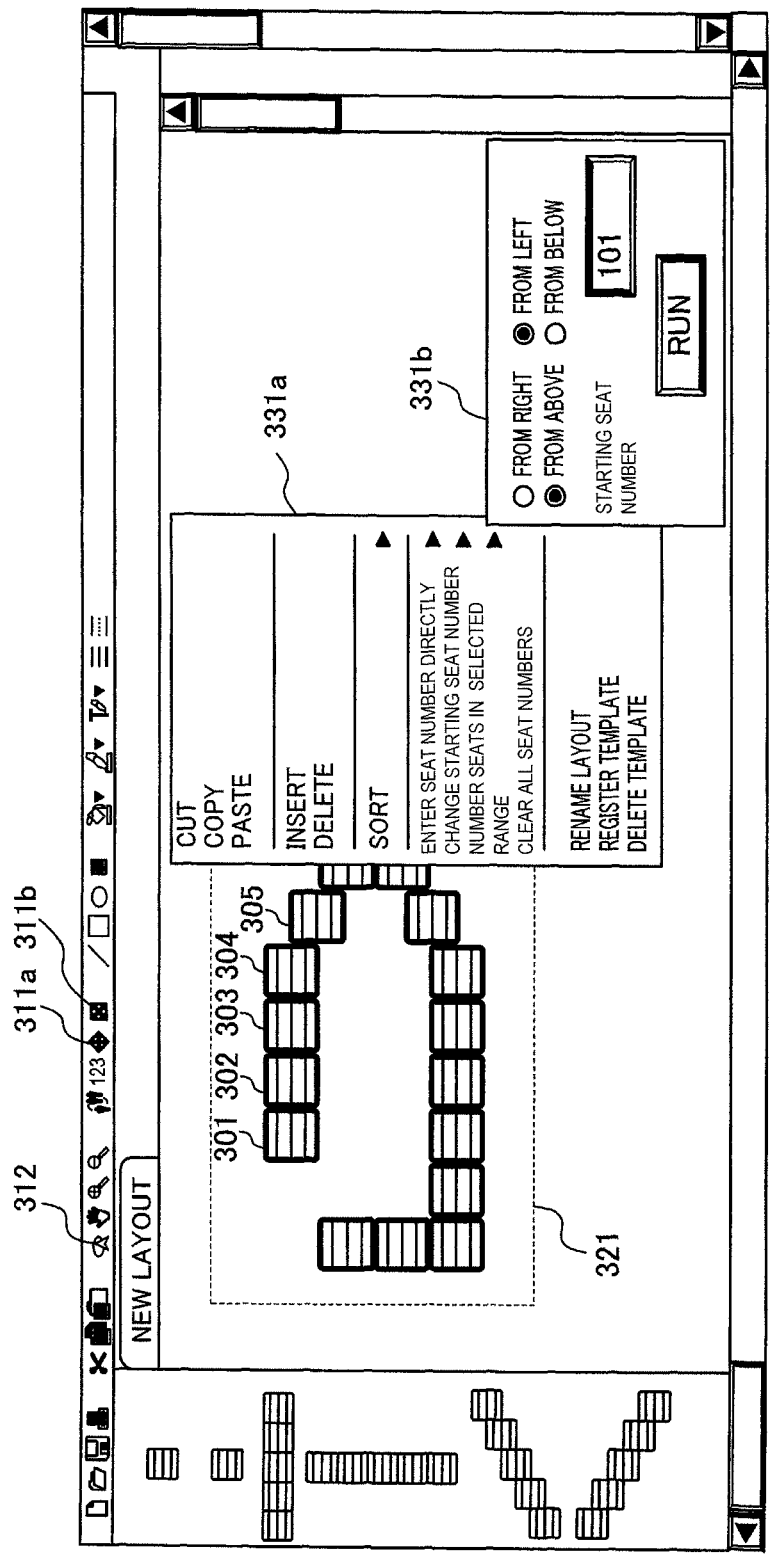
FIG. 3 is a diagram illustrating an example of a display screen of the computer 1.
Figures 4, 5:
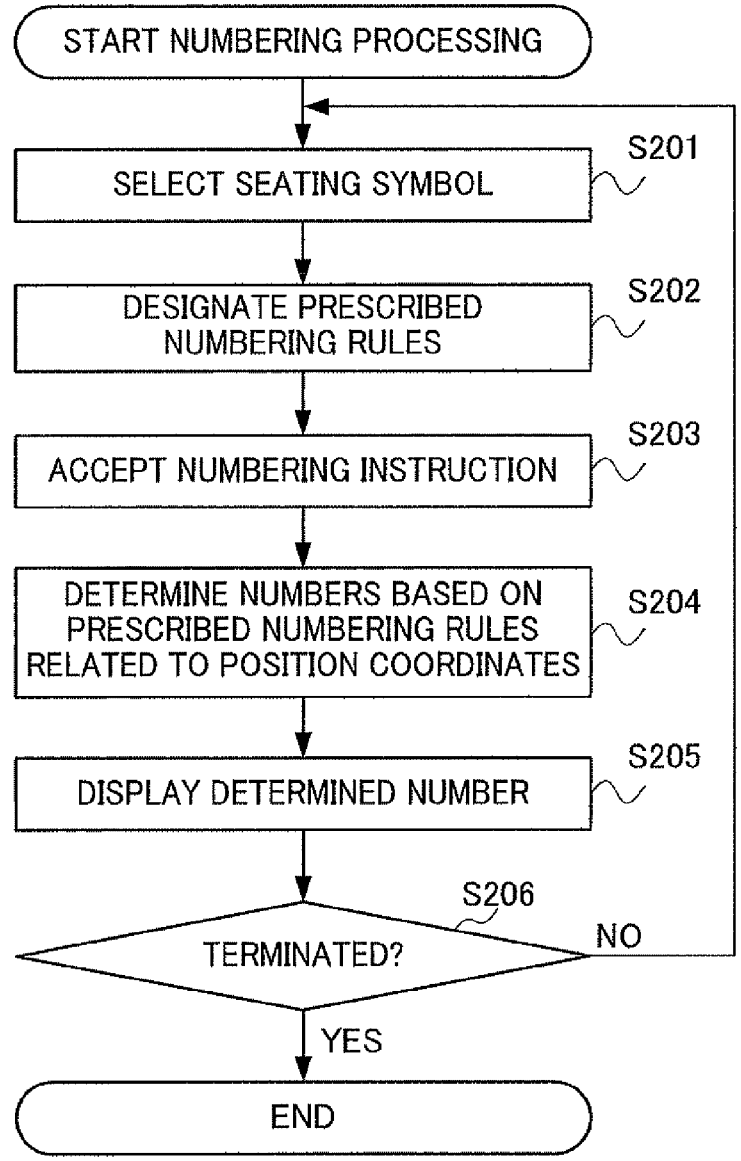
FIG. 4 is a diagram illustrating seating layout data.
FIG. 5 is a flowchart illustrating numbering processing of numbers.
Figure 6:
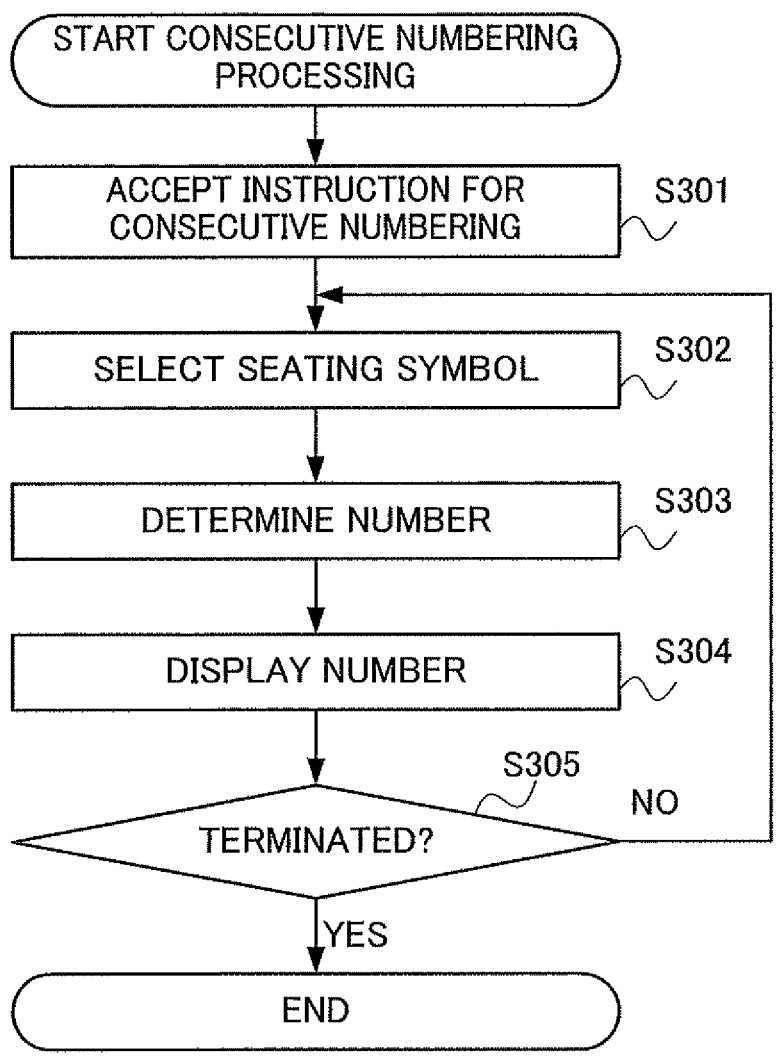
FIG. 6 is a flowchart illustrating consecutive numbering processing.
Figure 7:
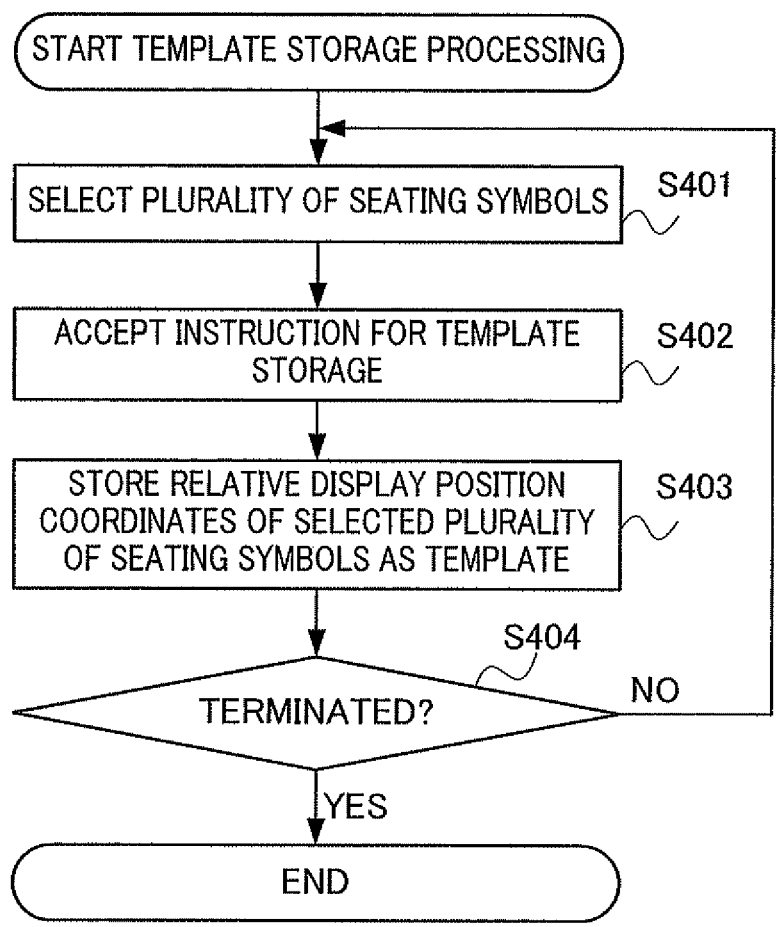
FIG. 7 is a flowchart illustrating template storage processing.
Figure 9:
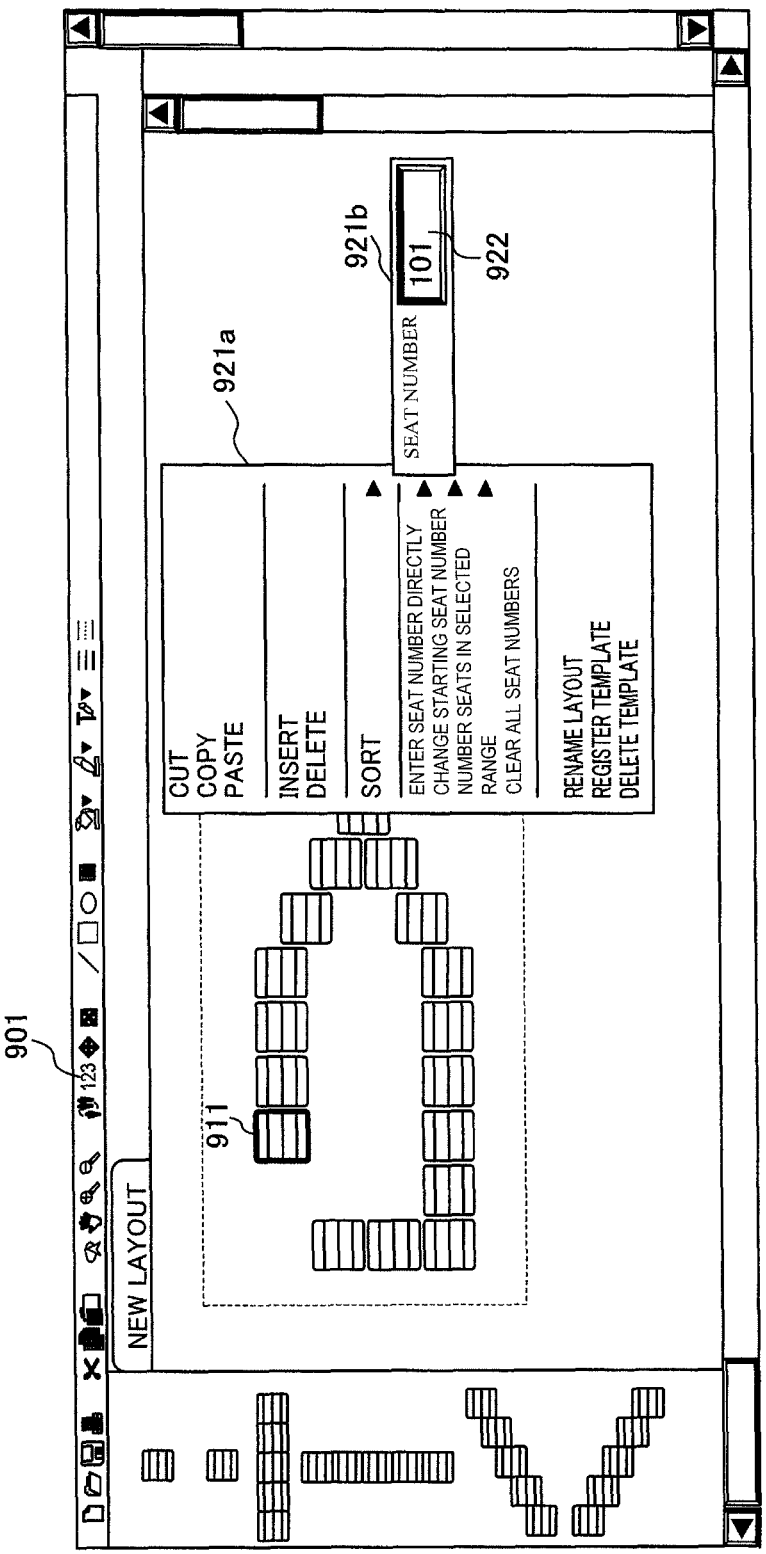
FIG. 9 is a diagram illustrating an example of a display screen of the computer 1.
Figure 10:
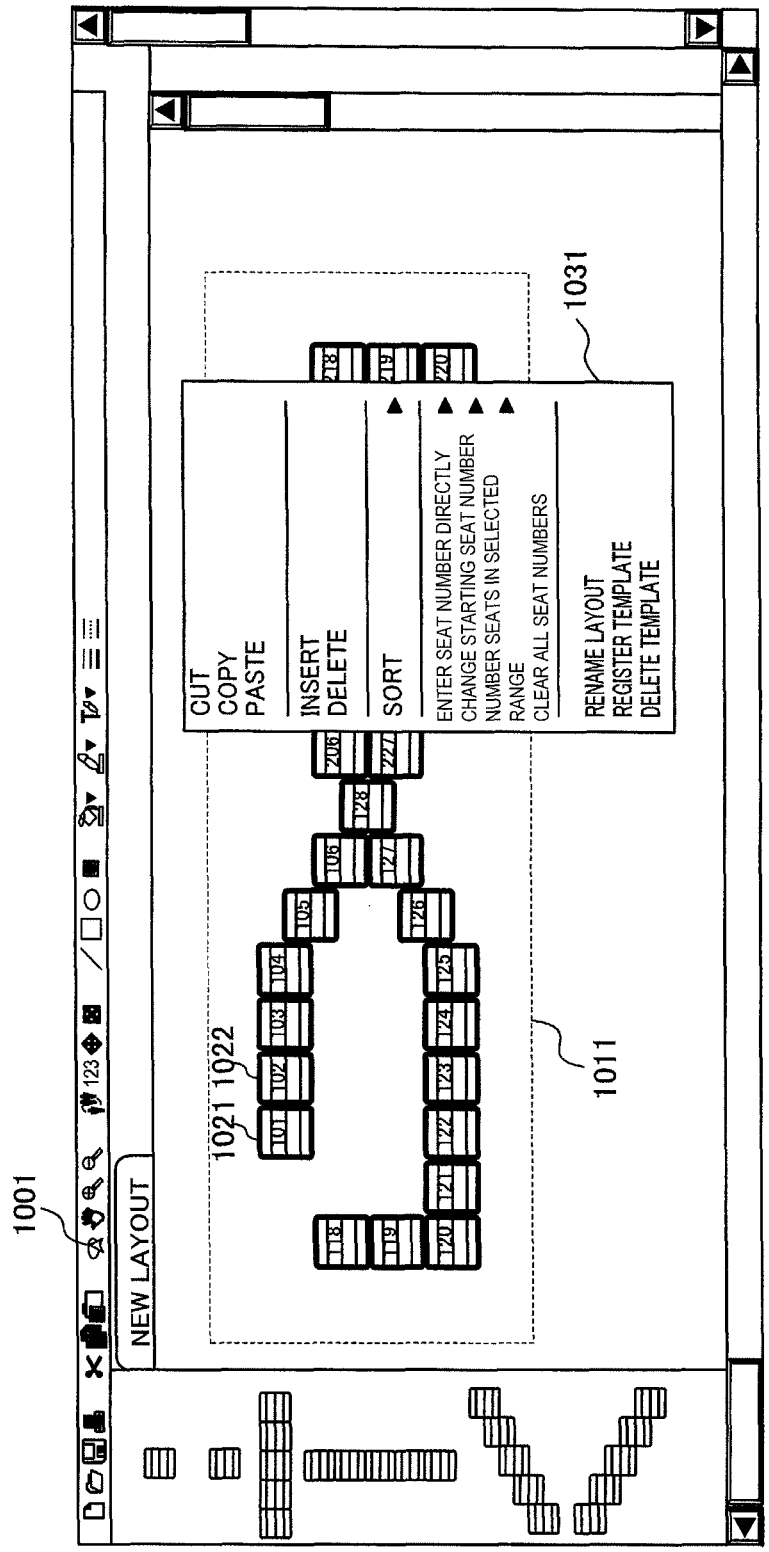
FIG. 10 is a diagram illustrating an example of a display screen of the computer 1.
Figure 11:
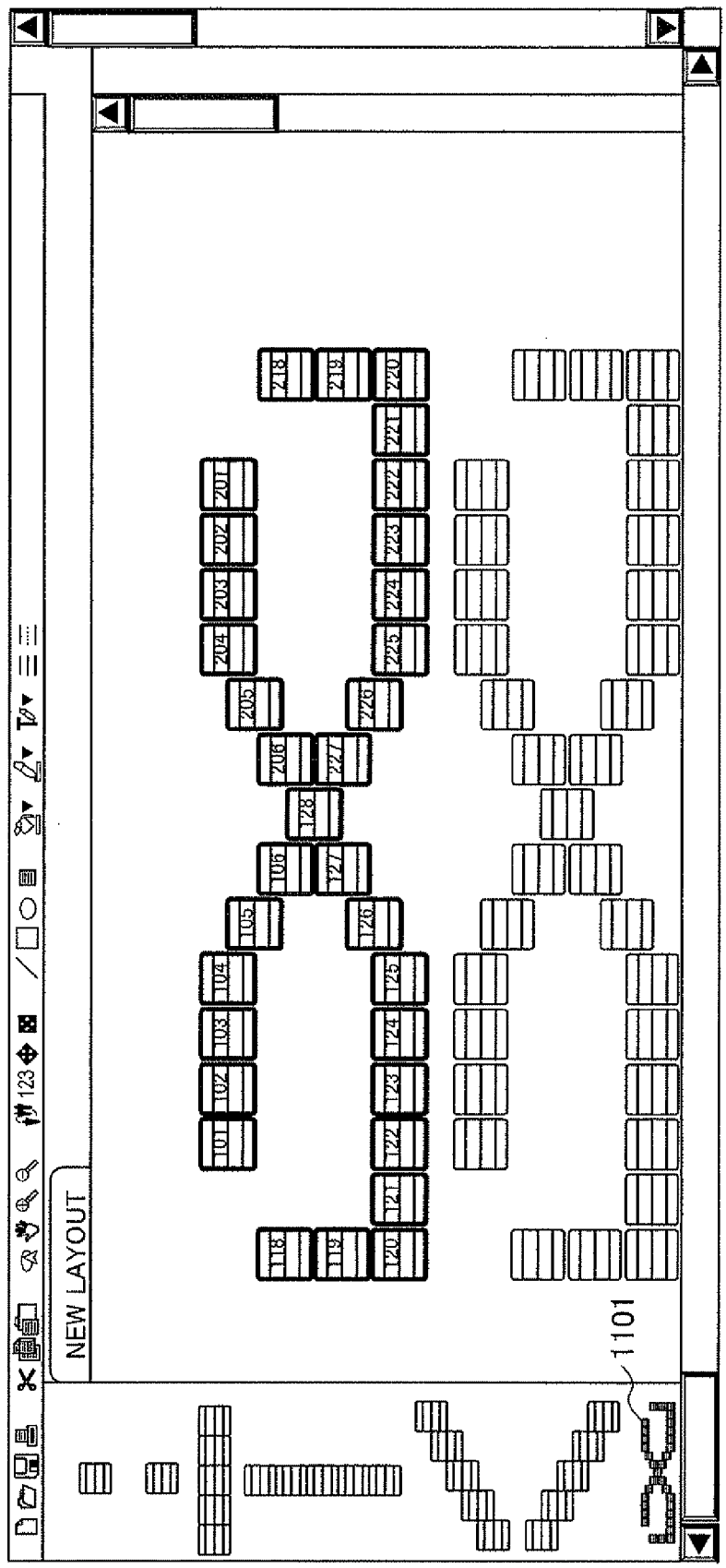
FIG. 11 is a diagram illustrating an example of a display screen of the computer 1.

FIG. 1 is a block diagram illustrating a functional configuration of a computer 1 relating to a preferred embodiment of the present invention. FIG. 2 is a flowchart illustrating seating layout creation processing. FIG. 3 is a diagram illustrating an example of a display screen of the computer 1. FIG. 4 is a diagram illustrating seating layout data. FIG. 5 is a flowchart illustrating numbering processing of numbers. FIG. 6 is a flowchart illustrating consecutive numbering processing. FIG. 7 is a flowchart illustrating template storage processing. FIG. 8 is a diagram illustrating template data. FIG. 9 is a diagram illustrating an example of a display screen of the computer 1. FIG. 10 is a diagram illustrating an example of a display screen of the computer 1. FIG. 11 is a diagram illustrating an example of a display screen of the computer 1.

Functional Configuration of the Computer

As illustrated in FIG. 1, the computer 1 relating to a preferred embodiment of the present invention is configured by connecting a controller 110, memory 120, a communication interface unit 130, an input unit 140, and a display unit 150 through a bus 160.

The controller 110 is an information calculation processing device carrying out calculation and processing of information, and may be a CPU (Central Processing Unit). Furthermore, the controller 110 carries out overall control of the computer 1, and by the controller 110 suitably reading and executing various programs stored in the memory 120, the above-mentioned hardware functions collaboratively in realizing various functions relating to the present invention.

Here, the display unit 150 is a device to display a screen to a user for accepting input of data, or for displaying calculation processing results of the computer 1 on a screen, and includes display devices such as a cathode-ray tube (CRT), a liquid-crystal display (LCD), and the like. Furthermore, as described above, the display device itself may be configured to include touch panel functionality, and may be realized as a single unit by incorporating a portion of functionality of the input unit 140 described below.

Here, the input unit 140 accepts input by a user, and may include a keyboard, a pointing device and the like such as a mouse, and the like. In addition, as described above, realization by including other device suitable for designating operation of directions, such as a joystick, an eight-directional button, or the like is also acceptable.

Here, a communication interface unit 130 is a network adapter for the purpose of enabling a computer 1 to connect through a special network or public network to a terminal. The communication interface unit 130 may include a modem, a cable modem, and an Ethernet (registered trademark) adapter.

Here, the memory 120 may include a local memory for use in executing a program in combination with the controller 110, high-capacity bulk memory, and cache memory for use in efficient search of the bulk memory. As a computer-readable medium for realizing the memory 120, it is acceptable to include a medium that can be realized electrically, magnetically, optically, or electromagnetically. More specifically, semiconductor storage devices, magnetic tapes, flexible discs, random access memory (RAM), read-only memory (ROM), and optical discs, including CD-ROMs, CD-R/Ws and DVDs, are included.

Furthermore, as described above, the computer 1 related to the present invention has been described; however, the computer 1 may be realized not only with a general-purpose so-called "personal computer", but with special hardware for which the principles of the present invention may be applied.

Seating Layout Creation Processing

As illustrated in FIG. 2, the computer 1 related to a preferred embodiment of the present invention carries out creation processing of a seating layout.

First, the controller 110 of the computer 1, for the purpose of generating seating symbol data included in seating layout data, accepts a designating operation of position coordinates to be a base point from a user of the computer 1 through the input unit 140 (Step S101). More specifically, the controller 110, in regards to seating layout data that the display unit 150 displays in a prescribed display area, accepts designating operation of desired coordinates (e.g., the position of the seating symbol 301 of FIG. 3) by clicks and the like of a pointing device such as a mouse and the like.

Next, the controller 110 similarly accepts a designating operation of a direction of generation of the seating symbol data from position coordinates as the base point in the display area from a user of the computer 1 through an input unit 140 (Step S102). More specifically, the controller 110, in regards to seating layout data that the display unit 150 displays in the prescribed display area, accepts designating operation of the direction by a pressing operation of a desired icon button (e.g., the arrow icon buttons 311a or 311b of FIG. 3) through a pointing device such as a mouse and the like.

Next, the controller 110 determines a position for displaying generated seating symbol data based on the base point and the direction which were designated (Step S103). More specifically, the controller 110, for example, in a case in which a seating symbol 301 of FIG. 3 is designated as a base point, and a pressing of a right arrow portion of an arrow icon button 311a is accepted, determines a position of the seating symbol 302, as a position for displaying a seating symbol newly generated.

Next, the controller 110 generates seating symbol data including position data representing a determined position, and stores thereof in a memory 120 (Step S104). More specifically, as illustrated in FIG. 4, as seating symbol data composing seating layout data, seating symbol IDs, x-coordinates, and y-coordinates become stored in the memory 120. In the example of FIG. 4, for example, with the upper-left of a display area displaying seating layout data as an origin, at a position where the x-coordinate is 25, and the y-coordinate is 10, a seating symbol of seating symbol ID 0001 is displayed, and the number (the numbering method of which is to be described later) of the seating symbol is 1. Furthermore, in a similar way, at a position where the x-coordinate is 30 and the y-coordinate is 10, a seating symbol of seating symbol ID 0002 is displayed, and the number (the numbering method of which is to be described later) of the seating symbol is 2. In this manner, seating layout data is composed to include a plurality of seating symbol data.

Next, the controller 110, based on position data included in generated seating symbol data, displays a seating symbol in the display unit 150 (Step S105). More specifically, as illustrated in FIG. 3, in the manner of seating symbol 302 being displayed to the right of seating symbol 301, seating symbol 303 being further displayed to the right, and so forth, newly generated seating symbol data is sequentially displayed.

In this manner, the computer 1, until accepting a termination instruction from a user (Step S106), sequentially generates seating symbol data to the left, right, top, bottom, or diagonally to the side or the like of the base point position through an operation of input unit 140 as a pointing device, such as a mouse or the like, and displays thereof on the display unit 150. As a result, it is possible for a user of the computer 1 to reduce trouble in creating a seating layout by manual operation with a method that does not depend on a template.

Numbering Processing for Numbers

As illustrated in FIG. 5, the computer 1 related to a preferred embodiment of the present invention carries out numbering processing.

First, the controller 110 accepts a selection operation of a seating symbol displayed in the display unit 150 (Step S201). More specifically, after accepting a click (press) operation of a pointing device as the input unit 140 such as a mouse or the like of the hoop icon button 312 of FIG. 3, the input mode switches to a "drag mode", a drag operation of a pointing device such as the mouse or the like is accepted for the prescribed area 321, and seating symbols 301, 302, and so forth are selected.

Next, the controller 110 accepts a designating operation of prescribed numbering rules (Step S202). More specifically, as illustrated in FIG. 3, the controller 110, after selecting the above-described seating symbols 301, 302, and so forth, accepts a right-click operation and the like of a pointing device such as a mouse or the like as the input unit 140, and displays a menu 331a in the display unit 150. Furthermore, the controller 110 accepts a selection operation of a "Number Seats in Selected Range" menu item of menu 331a through a click of a pointing device such as a mouse or the like, and displays a menu 331b in the display unit 150. Moreover, the controller 110, as illustrated in FIG. 3, accepts a designation of an order of precedence of numbering, such as, for example, "from left", "from above", by way of a click operation of a pointing device such as a mouse or the like, and further, accepts an input of, for example, the number "101" into the text box "Starting seat number" through an operation of a keyboard as the input unit 140.

By accepting this sequence of operations, the controller 110, for the selected seating symbols 301, 302, and so forth, carries out designation of the numbering rule "from the seating symbol in the upper-left, from number 101, sequentially numbering the seating symbols".

Next, the controller 110, by accepting a pressing of an "Run" button by a click operation of a pointing device such as a mouse or the like as the input unit 140, accepts a numbering instruction (Step S203).

Next, the controller 110, according to accepting of the above-described numbering instruction, based on the above-described designated numbering rule, carries out numbering on the designated seating symbols 301, 302, and so forth (Step S204). For example, in the example of FIG. 4, the seating symbol ID 0001 is numbered as 1, and the seating symbol ID 0002 is numbered as 2.

Next, the controller 110 displays the determined numbers on the display unit 150 (Step S205). More specifically, as illustrated in FIG. 10, numbers numbered sequentially from 101 are displayed.

The controller 110, by repeatedly carrying out the above-described series of processes until accepting a termination instruction (Step S206), numbers the seating symbols.

Consecutive Numbering Processing

As illustrated in FIG. 6, the computer 1 related to a preferred embodiment of the present invention executes consecutive numbering processing.

First, the controller 110, through a pointing device or the like such as a mouse or the like as the input unit 140, accepts a instruction for consecutive numbering (Step S301). More specifically, the controller 110 accepts the pressing operation of a number icon 901 illustrated in FIG. 9 through a pointing device or the like such as a mouse or the like.

Next, the controller 110, through a pointing device or the like such as a mouse or the like as the input unit 140, accepts a selection operation of a seating symbol to be numbered (Step S302). More specifically, the controller 110 accepts a selection operation of the seating symbol 911 illustrated in FIG. 9, for example, through a pointing device or the like such as a mouse or the like.

Next, the controller 110 determines a number for numbering the selected above-described seating symbol (Step S303). More specifically, the controller 110 numbers, for example, the seating symbol 911 illustrated in FIG. 9 as "101".

Moreover, it is possible to set the starting number when carrying out this consecutive numbering freely. For example, in FIG. 9, the controller 110, according to an accepting of a click operation or the like of a pointing device or the like of a mouse or the like as the input unit 140, displays menus 921a and 921b on the display unit 150, and furthermore, by accepting an input operation of a keyboard or the like as the input unit 140 for "seat number" for the text box 922, accepts input of "101".

By accepting a pressing of a "Run" button by a click operation of a pointing device such as a mouse or the like as the input unit 140, an instruction of numbering is accepted (Step S303).

Next, the controller 110 displays the determined above-described number on the display unit 150 (Step S304).

The controller 110, by repeatedly carrying out the above-described series of processes until accepting a termination instruction (Step S305), sequentially numbers seating symbols.

As a result, it is possible for the user to progress with sequential numbering by an intuitive and easy-to-understand operation, in which seating symbols that are desired to be numbered are clicked with a mouse or the like.

Template Storage Processing

As illustrated in FIG. 7, the computer 1 related to a preferred embodiment of the present invention carries out template storage processing.

First, the controller 110 accepts a selection operation for a plurality of seating symbols through an operation of a pointing device or the like such as a mouse or the like as the input unit 140. More specifically, the controller 110, for example, after accepting a click operation of a pointing device such as a mouse or the like as the input unit 140 in pressing the hoop icon button 1001 illustrated in FIG. 10, and switching the input mode to "drag mode", accepts a drag operation of a pointing device such as a mouse or the like in the prescribed area 1011 in selecting seating symbols 1021, 1022, and so forth.

Next, the controller 110 accepts a storage instruction operation of a template through an operation of a pointing device or the like such as a mouse or the like as the input unit 140 (Step S402). More specifically, the controller 110, for example, displays the menu 1031 on the display unit 150 by accepting a right-click operation of a pointing device or the like of a mouse or the like as illustrated in FIG. 10, and furthermore, by accepting a click operation of a pointing device or the like of a mouse or the like, accepts a selection of a "Register Template" menu item.

Next, the controller 110 stores the selected above-described seating symbols 1021, 1022, and so forth as a new template in the memory 120 (Step S403). Furthermore, for example, as with the template icon 1101 illustrated in FIG. 11, the seating symbols selected by the above-described selection operation is registered as a new template in a form in which it can be reused.

The template data is configured with seating symbol IDs, and relative coordinates (x-coordinates, y-coordinates) in which the upper-left coordinates of the series of seating symbols included in a template is (x, y)=(0, 0) (origin), as illustrated in FIG. 8. As a result, this series of seating symbols is stored in the memory 120.

In this way, the controller 110, until accepting a termination instruction from the user (Step S404), stores in the memory 120 combinations of pluralities of seating symbols as reusable components in new templates.

As above, an embodiment of the present invention has been described; however, the present invention is not to be limited to the above-described embodiment. Furthermore, the effects described in the embodiment of the present invention have only been recited as the most preferable effects generated by the present invention, and the effects of the present invention are not to be limited to those described in the embodiment of the present invention.

The invention claimed is:

1. A method of a computer creating a two-dimensional seating layout, the computer including a memory for storing seating layout data to include a combination of a plurality of seating symbol data displayed at prescribed positions in a prescribed display area of a display unit, the method comprising:

accepting from a user of the computer an operation for designating two-dimensional position coordinates to form a base point in the prescribed display area;

providing a user interface having a direction symbol configured to simultaneously point in a plurality of directions and configured to be continuously displayed at a predetermined position on the display unit, where the directions correspond to directions in a plane for generating seating symbol data;

accepting from the user, via the direction symbol, an operation for designating a direction of generating the seating symbol data with respect to the position coordinates as the base point in the prescribed display area;

determining a position for displaying a seating symbol in the prescribed display area, based on the position coordinates as the base point and the direction of generating the seating symbol data;

generating seating symbol data comprising position data representing the position determined, and storing the generated seating symbol data in the memory in addition to the combination of the plurality of seating symbol data included in the seating layout data;

displaying the seating symbol in the prescribed display area in the display unit based on the position data included in the generated seating symbol data;

storing in the memory the display position of the seating symbol data generated as position coordinates, the display position stored as a next base point which is used as a subsequent base point subsequent to a base point previously used without the user designating the next base point;

accepting, from the user, a further operation for designating a direction of generating seating symbol data without the user designating the next base point via the user interface having the direction symbol which is displayed at the predetermined position on the display unit;

determining a position for displaying the seating symbol in the prescribed display area, based on the position coordinates of the next base point and the direction of generating the seating symbol data;

generating seating symbol data comprising position data representing the position determined, and storing the generated seating symbol data in the memory in addition to the combination of the plurality of seating symbol data included in the seating layout data; and displaying the seating symbol in the display unit in the prescribed display area based on the position data included in the generated seating symbol data, wherein another seating symbol is displayed adjacent to a seating symbol in the direction indicated by the direction symbol, when designated position coordinates to form a base point are accepted from a user pointing to the seating symbol.

2. The method described in claim 1, further comprising:

accepting from the user an operation for selecting one or a plurality of seating symbol data to which numbers are to be assigned, from the combination of the plurality of seating symbol data;

accepting from the user an operation for instructing numbers to be used for numbering;

determining the numbers and storing thereof in the memory based on prescribed numbering rules relating to respective position coordinates in the prescribed display area in relation to the seating symbol data that has been selected through the operation performed by the user; and displaying the determined numbers in the display unit.

3. The method described in claim 2, further comprising, accepting from the user an operation for assigning priority relating to x-coordinates and y-coordinates constituting the position coordinates and an operation for designating of ascending or descending order applied to numbering of the position coordinates.

4. The method described in claim 1, further comprising:

accepting from the user an operation for starting numbering of the seating symbol data in a selected order;

accepting an operation for selecting the seating symbol data to be numbered; and numbering the selected seating symbol data incrementally in sequence.

5. The method described in claim 1, further comprising:

accepting an operation for selecting a plurality of seating symbol data from the user;

accepting an operation for storing a template; and storing relative position coordinates of each of the plurality of seating symbol data selected in the operation, as new template data in the memory.

6. The method described in claim 1, wherein the user interface comprises an icon.

7. The method described in claim 1, wherein the direction symbol is an arrow icon.

8. The method described in claim 1, wherein, when in a consecutive generation mode, the method further comprising accepting input of a plurality of times of continuous operation via the user interface from a user; and generating consecutively, a plurality of pieces of seating symbols in accordance with the plurality of times of continuous operation.

9. A computer for creating a two-dimensional seating layout, the computer comprising:

a memory for storing seating layout data to include a combination of a plurality of seating symbol data displayed at prescribed positions in a prescribed display area of a display unit;

a position unit for accepting from a user of the computer an operation for designating two-dimensional position coordinates to form a base point in the prescribed display area;

a user interface having a direction symbol configured to simultaneously point in a plurality of directions and configured to be continuously displayed at a predetermined position on the display unit, where the directions correspond to directions in a plane for generating seating symbol data and configured to receive a designation of a direction of generating the seating symbol data with respect to the position coordinates as the base point in the prescribed display area;

a unit for determining a position for displaying a seating symbol in the prescribed display area, based on the position coordinates as the base point and the direction of generating the seating symbol data, a unit for generating seating symbol data comprising position data representing the position determined, and storing the generated seating symbol data in the memory in addition to the combination of the plurality of seating symbol data included in the seating layout data;

a display unit for displaying the seating symbol in the prescribed display area in the display unit based on the position data included in the generated seating symbol data;

a memory unit for storing in the memory the display position of the seating symbol data generated as position coordinates, the display position stored as a next base point which is used as a subsequent base point subsequent to a base point previously used without the user designating the next base point;

a unit for accepting, from the user, a further operation for designating a direction of generating seating symbol data without the user designating the next base point via the user interface having the direction symbol which is displayed at the predetermined position on the display unit;

a unit for determining a position for displaying the seating symbol in the prescribed display area, based on the position coordinates of the next base point and the direction of generating the seating symbol data;

a unit for generating seating symbol data comprising position data representing the position determined, and storing the generated seating symbol data in the memory in addition to the combination of the plurality of seating symbol data included in the seating layout data; and the display unit displaying the seating symbol in the prescribed display area based on the position data included in the generated seating symbol data, wherein when the position unit accepts a selection of one seating symbol indicated by the user pointing, as position coordinates forming a base point, the display unit displays another seating symbol adjacent to the one seating symbol in the direction indicated by the direction symbol.

10. The computer described in claim 9, wherein the user interface having a direction symbol is configured to allow the user to perform a plurality of times of continuous operation and wherein, when in a consecutive generation mode, the unit accepting, from the user, a further operation for designating a direction of generating seating symbol data without the user designating the next base point via the user interface having the direction symbol which is displayed at the predetermined position on the display unit, accepts the plurality of times of continuous operation, the unit for determining a position for displaying the seating symbol in the prescribed display area, determines positions for display of a plurality of pieces of seating symbols for the plurality of times of continuous operation, one position for each of the plurality of pieces of seating symbols, and the unit for generating seating symbol data, generates the plurality of pieces of seating symbols consecutively, comprising respective position data representing the position determined.

11. A non-transitory storage device storing a machine-readable program for creating a two-dimensional seating layout in a computer that includes a memory for storing seating layout data to include a combination of a plurality of seating symbol data displayed at prescribed positions in a prescribed display area of a display unit, the non-transitory storage device including instructions for causing the computer to execute a method comprising:

accepting from a user of the computer an operation for designating two-dimensional position coordinates to form a base point in the prescribed display area;

providing a user interface having a direction symbol configured to simultaneously point in a plurality of directions and configured to be continuously displayed at a predetermined position on the display unit, where the directions correspond to directions in a plane for generating seating symbol data;

accepting from the user, via the direction symbol, an operation for designating a direction of generating the seating symbol data with respect to the position coordinates as the base point in the prescribed display area;

determining a position for displaying a seating symbol in the prescribed display area, based on the position coordinates as the base point and the direction of generating the seating symbol data;

generating seating symbol data comprising position data representing the position determined, and storing the generated seating symbol data in the memory in addition to the combination of the plurality seating symbol data included in the seating layout data;

displaying the seating symbol in the prescribed display area in the display unit based on the position data included in the generated seating symbol data;

storing in the memory the display position of the seating symbol data generated as position coordinates, the display position stored as a next base point which is used as a subsequent base point subsequent to a base point previously used without the user designating the next base point;

accepting, from the user, a further operation for designating a direction of generating seating symbol data without the user designating the next base point via the user interface having the direction symbol which is displayed at the predetermined position on the display unit;

determining a position for displaying the seating symbol in the prescribed display area, based on the position coordinates of the next base point and the direction of generating the seating symbol data;

generating seating symbol data comprising position data representing the position determined, and storing the generated seating symbol data in the memory in addition to the combination of the plurality of seating symbol data included in the seating layout data; and displaying the seating symbol in the display unit in the prescribed display area based on the position data included in the generated seating symbol data, wherein another seating symbol is displayed adjacent to a seating symbol in the direction indicated by the displayed direction symbol, when designated position coordinates to form a base point are accepted from a user pointing to the seating symbol.

12. The non-transitory storage device described in claim 11, wherein the machine-readable program includes instructions for causing the computer to execute a consecutive generation mode, wherein when in the consecutive generation mode, the method further comprising accepting input of a plurality of times of continuous operation via the user interface from a user; and generating consecutively, a plurality of pieces of seating symbols in accordance with the plurality of times of continuous operation.

* * * * *